Jan. 14, 1964  A. F. GIORDANO  3,117,488
COLOR PATTERN DISPLAY SYSTEM
Filed April 12, 1960  4 Sheets-Sheet 1
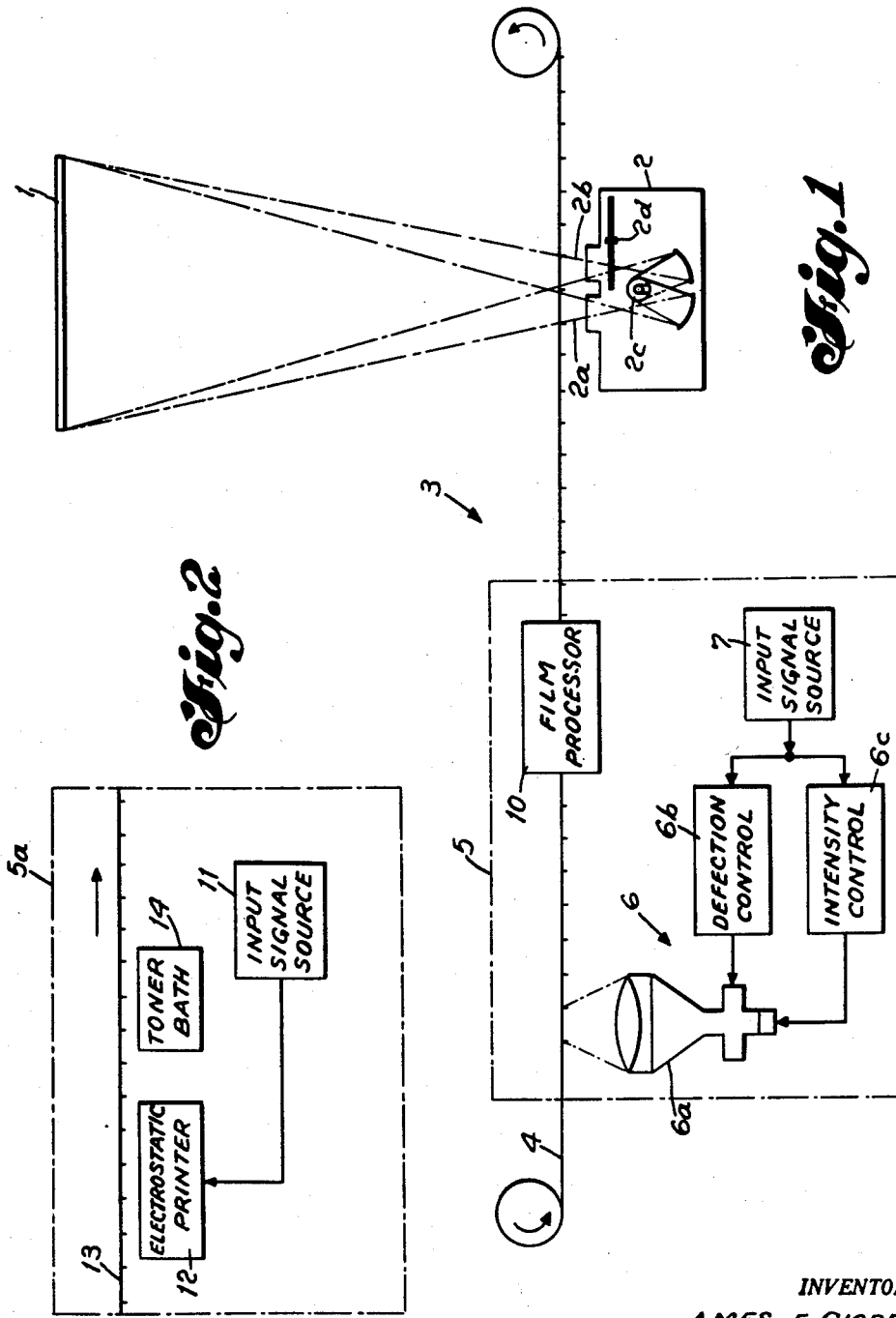
INVENTOR.
AMES F. GIORDANO
BY Philip M. Bolton
ATTORNEY Jan. 14, 1964  A. F. GIORDANO  3,117,488
COLOR PATTERN DISPLAY SYSTEM
Filed April 12, 1960  4 Sheets-Sheet 2

INVENTOR.
AMES F. GIORDANO
BY *Philip M. Bolton*
ATTORNEY

Jan. 14, 1964  A. F. GIORDANO  3,117,488
COLOR PATTERN DISPLAY SYSTEM
Filed April 12, 1960  4 Sheets-Sheet 3
Fig. 4
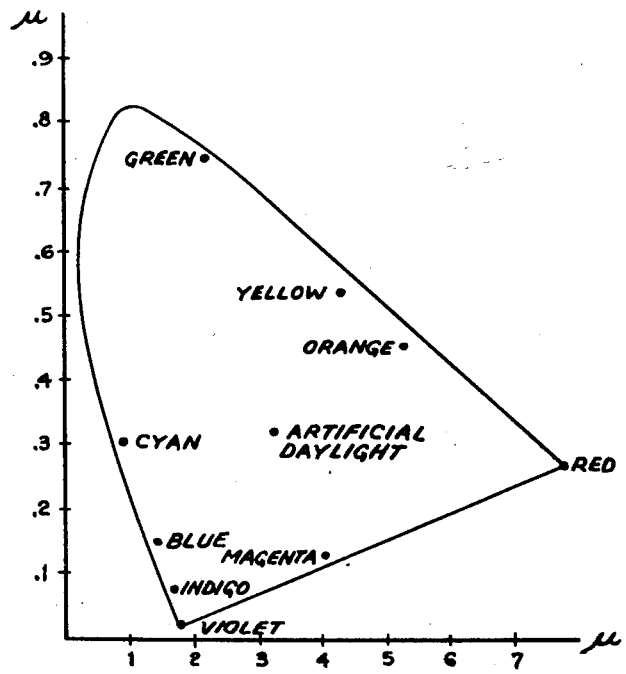
Fig. 3A
Fig. 5A
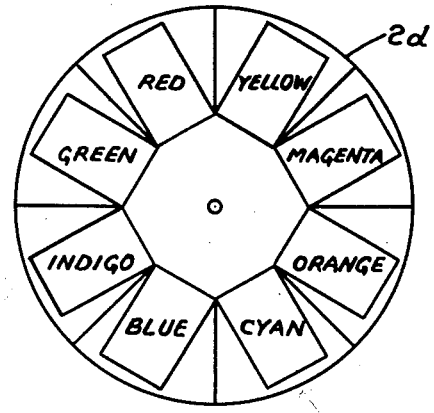
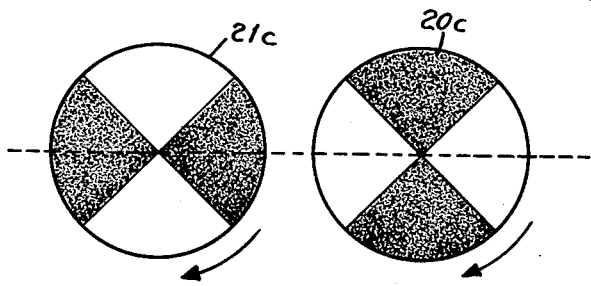
INVENTOR.
AMES F. GIORDANO
BY Philip M. Bolton
ATTORNEY Jan. 14, 1964  A. F. GIORDANO  3,117,488
COLOR PATTERN DISPLAY SYSTEM
Filed April 12, 1960  4 Sheets-Sheet 4

INVENTOR.
AMES F. GIORDANO
BY Philip M. Bolton
ATTORNEY

United States Patent Office 3,117,488
Patented Jan. 14, 1964

3,117,488
COLOR PATTERN DISPLAY SYSTEM
Ames F. Giordano, Newark, N.J., assignor to International Telephone and Telegraph Corporation, Nutley, N.J., a corporation of Maryland
Filed Apr. 12, 1960, Ser. No. 21,798
5 Claims. (Cl. 88—24)

The present invention relates to display systems, and more particularly to a system for producing colored information displays.

In the field of information and data handling it is often desirable to project the information or data onto a large display area where it may be viewed by one or more observers. Systems currently exist which can convert input information into a projected black and white display, however such systems can convey the information to the observer only by means of the intelligence represented by the symbols or characters appearing in the display. It would be desirable to have a more versatile display system wherein information could be displayed in multicolor, so that the colors or color combinations could also be coded to convey intelligence. For example, the altitude, range, and velocity of an aircraft may be displayed to ground observers by having the representative numerical values of each projected in separate predetermined colors. Likewise, a map or graph may be displayed in multicolor such that the color of each segment of the map or graph conveys distinct intelligence to the viewer.

Generally it is characteristic of existing multicolor display systems that the information to be projected must first be in multicolor form, as in the case of transparent photographic color slides, or that an equivalent multicolor light source be employed, or that a tricolor projection scheme be employed wherein the information is prepared in triplicate, projected with three different colored light sources, and precisely resolved upon the display surface. Such systems are necessarily complex and are not readily adaptable to presently available data writing devices.

It is therefore an object of the present invention to provide an improved display system for producing multicolored displays.

Another object of the present invention is to provide a multicolor display system using a single monochromatic color source in combination with a source of white light.

A further object of the present invention is to provide a system for providing a multicolor display from opaque printed information, A feature of the present invention is the provision of a display system having a display means, a source of white light and colored light, and means to selectively apply the white light and the colored light on the display means to produce a visual display including a color other than the color of the colored light source.

Another feature of the present invention is the provision of a display system of the type described wherein the means to selectively apply the white light and the colored light on the display includes a transparent medium having opaque printing thereon, and means to selectively project the white light and the colored light through the transparent medium to produce a multicolor display on the display means.

The above-mentioned and other features and objects of this invention will become more apparent by reference to the following description taken in conjunction with the accompanying drawings, in which:

FIG. 1 is a block and schematic diagram of one embodiment of a display system following the principles of the present invention.

FIG. 2 is a similar diagram of another embodiment of a printing device which could be used in the embodiment of FIG. 1.

FIG. 3a is an illustration of an arrangement of color filters for use in the embodiment of FIG. 1.

FIG. 4 is an illustration of a chromaticity diagram useful in explaining the present invention.

FIG. 5a is an illustration of a pair of discs for use in the embodiment of FIG. 5.

Figure 3:
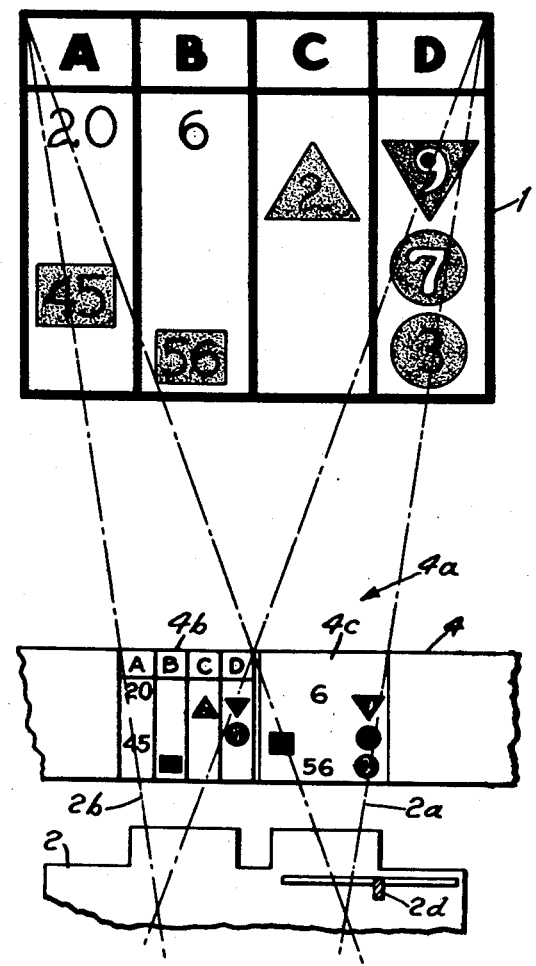
FIG. 3 is an illustration of one possible multicolor display obtainable with the present invention.

Referring to FIG. 1, a display system is shown comprising a display means 1, a source 2 of white light 2a and colored light 2b, and means 3 to selectively apply said white light 2a and said colored light 2b on said display means 1 to produce a visual display including a color other than said color of said colored light source 2b.

More specifically means 3 to selectively superimpose said white light 2a and said colored light 2b on said display surface 1 includes a transparent printing medium 4 and a printing means 5.

The term "color" and "colored light" as used herein refers to chromatic color having observable hues such as red, green, blue, etc. as distinguished from achromatic light such as black and white, which will be referred to specifically as "black" and "white."

Before explaining the operation of the display system shown in FIG. 1, it is necessary to discuss the principles on which the system is founded. It is known that the perceived color of a visual field, as well as saturation and brightness, is dependent not only on the wavelength and luminance of the stimuli, but on the simultaneous stimulation of the remainder of the visual field. Thus, when a given color in a visual field is surrounded by a second given color, the first given color undergoes a change in hue, and can appear as its complementary color. A commonplace example of this phenomena is the tungsten streetlight which appears vivid white at night when the surrounding area is black, and the yellow color of the same light in the daytime, when surrounded by white sunlight. A discussion of this phenomenon, with its mathematical basis, can be found in the Jameson-Hurvich article appearing in volume 49, Number 9, in the Journal of the Optical Society of America entitled "Perceived Color and its Dependence on Focal, Surrounding, and Preceding Stimulus Variables."

A general statement of the phenomenon as it pertains to the present invention may be stated thus: When a small display area is receiving white light (preferably approximate daylight) and is surrounded by a large display area receiving a mixture of white light and colored light, the small display area will appear deficient in the color of the colored light, and therefore appear as having the complementary color of the colored light. For example, a small area on a projection screen illuminated by white light from a projector appears cyan (blue-green) when the remainder of the screen is illuminated with a mixture of red and white light. The red-white mixture will appear essentially as white, but having "warm-white" qualities. When the observer views the small area receiving white light only and surrounded by the "warm-white," he senses a deficiency in red in the small area. A deficiency of red appears, in terms of hue, as cyan, or blue-green. The sensed blue-green on a white background is not an illusion, but is an instantaneous sensation of normal color vision.

Referring once again to FIG. 1, a novel display system is shown which, by employing the above described phenomena, will provide a multicolor information display. A display means 1 is located in a suitable position, and may be a neutral background projection screen. A printing medium 4 is provided, which for purposes of the embodiment of FIG. 1 is photo-sensitive film, but as will be later explained, can be any transparent medium subject to opaque printing.

Printing medium 4 is passed in close relation to printing means 5. Printing means 5 includes a character writing cathode ray tube system 6, input signal source 7 and film processor 10. Input signal source 7 which may be a receiver, a computer, a signal storage etc., transmits coded information signals (either digital or analog) in a desired format to deflection control 6a and intensity control 6b of cathode ray tube system 6 so that the intelligence conveyed by the input signals from source 7 is ultimately printed on selected areas of printing medium 4 by means of cathode ray tube 6. Cathode ray tube 6 may be any one of several currently available character writing tubes, or any suitable line-writing cathode ray tube. Since the electron beam of cathode ray tube 6 is composed of radiant energy, the said selected areas of photo-sensitive printing medium 4 will be light exposed. The printed selectively light exposed medium is then transported through film processor 10. Film processor 10 is a commercially available high-speed negative process developer capable of processing film in five seconds. The processed printed medium, after leaving processor 10, will have the light exposed portions appear as opaque printing on a transparent background. In the present specification the term "printing" and related terms are to be understood as not necessarily involving mechanical pressure, but relates to any means of effecting a character, image, symbol indicia, picture or other representation, either singly or in combination, on a suitable surface herein referred to as a "printing medium."

The printed medium is then transported to a predetermined position in front of light source 2. Light source 2 includes a source of white light 2b which in the preferred embodiment, is artificial light approximately equivalent to average daylight, having a color temperature of 6750 K. Light source 2 also includes a source of colored light 2b which may be obtained by color filtering the initial source of white light from lamp 2c by means of color filter 2d. White light 2a and colored light 2b are selectively projected through the printed medium 4 and superimposed on display means 1.

in a manner well known in the art. The charged belt is passed in close proximity to toner bath 14 where opaque ink particles contained therein adhere to the charged areas of belt 13, thereby forming opaque printing. Still another feasible system would include a polished reflective medium having opaque characters thereon where the sources of light are reflected off the polished medium onto a display surface.

The manner and means by which light sources 2a and 2b are selectively projected and superimposed to form a multicolor display may be more readily understood by reference to FIG. 3. In FIG. 3 medium 4 has been revolved 90 degrees for clarity in the discussion. Light source 2 projects white light through the left half frame portion 4b of frame 4a which is a section of printed medium 4 (or medium 13). A source of colored light (i.e., red) is projected through the right half portion 4c of frame 4a. It is immaterial whether the colored light is located to the left or to the right of the white light as long as the frame portions 4b and 4c are selectively printed in accordance. Frame 4a has been previously printed to have an arrangement of selected opaque and transparent areas by suitable printing means as previously discussed. The possible quality of the light falling on display means 1 will be either red, white, or a mixture of red and white—this mixture appearing essentially as "white" and will hereinbelow be referred to as soft-white—depending on the location of the opaque areas of frame 4a. When corresponding areas of the left portion 4b and right portion 4c of frame 4a are transparent, red and white light falls on display means 1 and the related area on display means 1 will be soft-white. When an area of frame portion 4b is opaque and the correspondingly located area of frame portion 4c is transparent, only red light will fall on the similarly related area of display means 1. Conversely, when an opaque area appears on frame portion 4c and a transparent area appears on the corresponding location of frame portion 4b, the related area on display means 1 will receive only white light. Employing now the aforesaid phenomena of color surrounds, the usable possible combinations of red and white light and green and white light are tabulated in Table I as appears below.

*Table I*

| Quality of Light on Display | | | Display Effect | | |
|---|---|---|---|---|---|
| Symbol | Surround | Background | Symbol | Surround | Background |
| Red (narrow) | red-white | red-white | Black | soft-white | soft-white. |
| Red (broad) | do | do | Red | do | Do. |
| none | red | do | Black | dark-red | Do. |
| Do | white | do | Do | cyan | Do. |
| White | red-white | do | Cyan | soft-white | Do. |
| Do | red | do | Do | red | Do. |
| Red | white | do | Red | cyan | Do. |
| White | none | do | Cyan | black | Do. |
| Red | do | do | Red | do | Do. |
| Red-white | do | do | Soft-white | do | Do. |
| Green (narrow) | green-white | green-white | Black | soft-white | soft-white. |
| Green (broad) | do | do | Green | do | Do. |
| none | green | do | Black | dark-green | Do. |
| Do | white | do | Do | magenta | Do. |
| White | green-white | do | Magenta | soft-white | Do. |
| Do | green | do | Do | green | Do. |
| Green | white | do | Green | magenta | Do. |
| White | none | do | Magenta | black | Do. |
| Green | do | do | Green | do | Do. |
| Green-white | do | do | Soft-white | do | Do. |

It is to be noted that the present invention is not restricted in its operation to the use of photo-sensitive printing media. For example, a second means of producing the opaque printing on a medium is illustrated in FIGURE 2. In this embodiment the input signal source directly controls the printing head matrix of electrostatic printer 12. Electrostatic printer 12 electrostatically charges selected areas of a transparent dielectric printing belt 13

Referring again to FIG. 3, it is seen that the opaque horizontal and vertical lines and alphabetic characters printed on frame portion 4b prevent any white light from reaching display means 1. The correspondingly located areas of frame portion 4c are completely transparent, and since the said printed lines and characters of frame 4b in question are relatively thick, the resultant effect on display means will be red lines and characters on a soft white background. Opaque numeral "20," printed on frame portion 4b, likewise inhibits white light, whereas the corresponding area of frame portion 4c is transparent. However, since numeral "20" has been printed with relatively narrow strokes, the effect on display means 1 will be black numerals on a soft white background. This is because, with normal visual acuity, a thin red line on a white background will appear black, but a broad stroke of red will appear as red. Numeral "45" of frame portion 4b inhibits white light, but a large opaque square in the correspondingly located area of frame portion 4c also inhibits red light. The effect on display means 1 is a black numeral (since numeral "45" receives neither white nor red light), in a square cyan surround, on a soft white background due to the square surround receiving white light only and being completely surrounded by soft white (see Table I). Numeral "56" printed on frame portion 4c inhibits red light. An opaque square printed on the correspondingly located area of frame portion 4b inhibits white light. The effect on display means 1 will be a black numeral "56" (no light received) on a dark red surround, with a soft white background. An opaque triangular area appears on frame portion 4b with a transparent numeral "2" appearing within. The correspondingly located area of frame portion 4c is completely transparent. Therefore, no display means 1 numeral "2" will receive soft white light. The triangular surround will receive red light only and the background will be soft white, producing the effect of a cyan numeral "2" on a red surround on a white background. Conversely, the opaque circular surround having transparent numeral "3" within will result in a red lighted numeral "3" appearing on a white lighted surround on a soft white background, thereby producing a red numeral "3" on a cyan surround on a white background. Numeral "6" printed on frame portion 4c will result in a white lighted numeral having a soft white surround on a soft white background producing the effect of a cyan numeral "6" on a soft white background. When circular opaque area having a transparent numeral "7" within is located on frame portion 4b and a solid opaque circle is located on the corresponding area of frame 4c, the net result on display means 1 will be a white light numeral on a black surround on a soft white background. The effect will be a cyan numeral on a black surround on a soft-white background. Conversely, it is seen that on frame 4c numeral "9" located within the inverted triangular surround and the solid opaque triangle located on frame 4b will result in a red numeral on a black surround on a soft-white background.

It is also possible in the latter instance of numeral "7" and "9," to have the completely opaque triangular and/or square surround also have the related numeral transparently inscribed within to permit light to transmit. In such case a soft-white numeral on a black surround on a soft-white background would result. However, this would necessitate a high degree of resolution in the location of the numerals and surrounds.

It is seen that ten possible distinct color combinations can be produced through a four color display by employing a novel system employing only two beams of light and a selectively opaque-transparent printed medium.

If a green filter is employed, the light sources be white and green and the possible effects on display means 1 will be as set forth in Table I. Generally, for any colored light source the possible colors produced on display means 1 will include black, white, the color of the light source used, and the complement of the color of the light source used. The complement of any color source used may be predicted by reference to the chromaticity diagram appearing in FIG. 4. The chromaticity diagram as substantially depicted in FIG. 4 is issued by the International Commission on Illumination. The predictable color complement of any light source employed in the present system may be determined by plotting a straight line connecting the color of the source employed and the point representing the source of white artificial daylight. Thus, the complement of light in the red region is cyan and conversely, the complement of cyan light is red. If a green filter was employed in the present system, complementary magenta would appear on display means 1. Likewise, displays including yellow and indigo, and orange and blue may be produced. It is also possible that the density of the opaque portions of the printing medium may be controlled so that a predetermined percentage of light is permitted to pass through. In such case the perceived hue of the display area may be varied. As an example, it was said that if a pure white lighted area were surrounded by a red-white lighted area the resultant display would appear as cyan and soft-white. However, if the opaque area of the printed medium were not 100 percent light inhibitive, the white lighted area would contain some red light, but not to the extent contained by the surrounding area. Nevertheless, the fact that the center area contains some red light reduces the observer's sense of red deficiency, and the perceived color will no longer be the exact complement of red, but will be a color on the chromaticity diagram which is displaced from the complement of red in the direction of the red hues. As a result, it would be possible to change the cyan and soft-white display to a yellow and soft-white display by the controlled addition of red light to the white lighted center area of the display. This is likewise true for the other colored light sources which may be used.

In order to readily change the color of the light source 2a, a plurality of filters may be arranged as shown by filter means 2d in FIG. 3a. To change the hue of the colored light source the operator need only bring into position the particular filter desired. Also, for any given printed frame, changing the filter will produce an entire new group of color combinations. For example, the preceding discussion related to the color combinations produced by frame 4a with red light whereas if a green filter were employed, the display produced would have green substituted for the red portions and magenta substituted for the cyan portions. With this versatile feature, the color filter selected at any given time could also be made indicative of some factor of the ultimate information conveyed to the observer. For instance, if the observer views a particular frame having red, black, cyan, and white color combinations, he could be apprised as to the altitude, range, velocity, position, etc. of aircraft relating to commercial traffic, whereas if the same display appeared in green, black, magenta, and white, the observer would know that military aircraft were involved.

It is conceivable that in some applications in which the present invention will be employed, while certain information appearing on a frame is being displayed, later received information has been printed and processed on the next succeeding frame and is awaiting display. For example if, a given frame contains dynamic troop or logistic information and is being positionally displayed on a terrain map display, the next succeeding frame will contain the new positional information of the troops or equipment on the same terrain at a later finite period of time. It would be desirable to project the new information on the display surface in a smooth and continuous manner, or to then re-project the initial information appearing on the initial frame after the second frame has been viewed.

Figure 5:
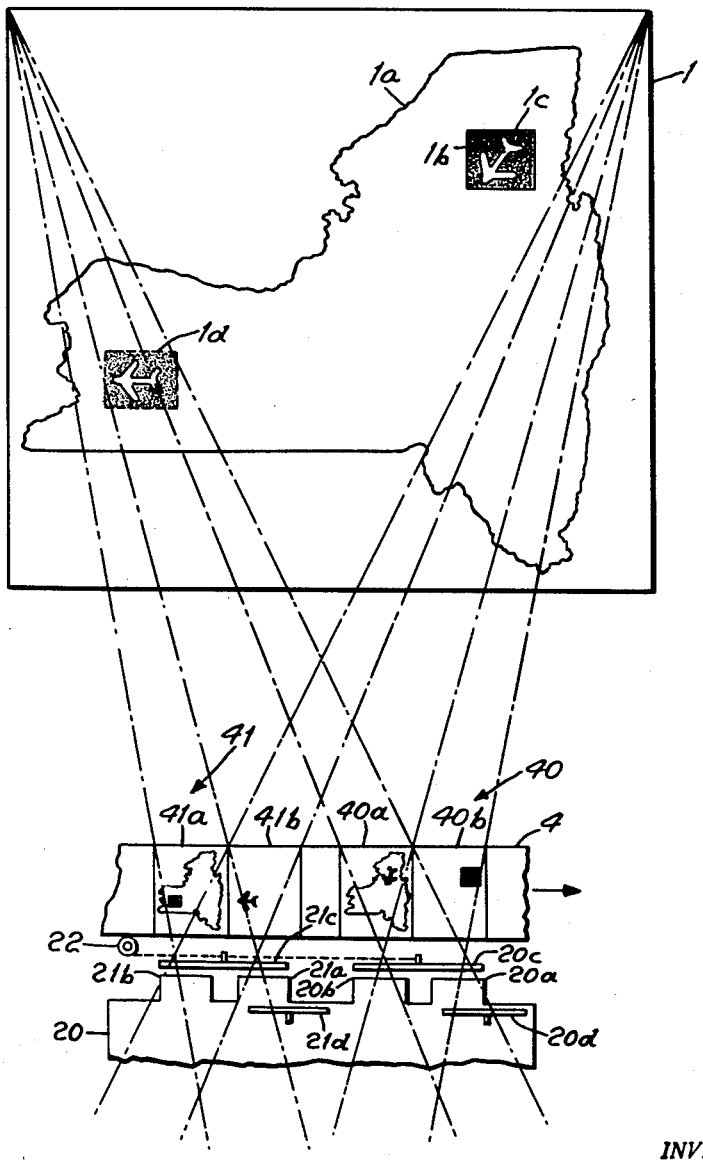
FIG. 5 is another embodiment of a display system following the principles of the present invention.

Referring to FIG. 5, still another embodiment of the present invention is illustrated wherein the information printed on succeeding frames of the printing medium may be displayed on a display means in a continuous manner. FIG. 5 shows a light source 20 which can be said to be a dual version of the light source 2 shown in FIG. 1. Light source 20 includes two sources of white light 20b and 21b, and two sources of colored light 20a and 21a. Sources of colored light 20a and 21a include an arrangement of color filters 20d and 21d respectively, each identical to the arrangement of color filters 2d shown in FIG. 3.

Therefore, sources of colored light 20a and 21a may or may not be of the same color at any one time, at the option of the operator. Each pair of sources of light 20a, 20b, and 21a, 21b, are selectively masked by means of two rotatable discs 20c and 21c, each of which contain successively opaque and transparent quadrants. Discs 20c and 20d are mechanically interconnected so that they may be rotated in equal unison. Further, the opaque quadrants of disc 20c are positionally related to the transparent quadrants of disc 21c, and vice versa. Discs 20c and 21c are more clearly illustrated in FIG. 5a. By judiciously locating discs 20c and 21c in front of sources of light 20a, 20b, 21a, and 21b, preferably where the light beams are narrowest, one pair of the two pair of light sources may be transmitted while the other one pair is blocked. In all other respects the display system of FIG. 5 is identical to that previously described in FIGS. 1 and 2 with the exception that the mechanical movements of discs 20c and 21c and printing means 4 may be made related by a mechanical connection 22.

In operation, a given printed frame 40 bearing printed information is positioned relative to source of white light 20b and source of colored light 20a, which for purposes of explanation will be chosen as red. The method of printing the information and the method of projecting it upon display means 1 is the same as has been described hereinabove for FIGS. 1 and 3. With disc 20c positioned with its transparent quadrant transmitting the light sources 20a and 20b, the information displayed on display means 1 will include (also for purposes of explanation) a black outline of a geographical area 1a and a black aircraft silhouette 1b within a square cyan surround 1c, conveying to the observer that an aircraft is in a given geographical position and is unidentified (i.e., cyan surround). After a finite time which may be as short as five seconds, a succeeding frame 41 is produced containing later, more updated information. Frame 41 is positioned in front of source of white light 21b and source of green light 21a. If printing medium 4 is a continuous strip as shown, it is understood that light sources 20a, 20b, 21a and 21b must be positioned to agree with the frame spacing. With frame 41 already in position, discs 20c and 21c are rotated. Due to the movement of the opaque and transparent quadrants, the light from sources 20a and 20b will be blocked simultaneously as the light from sources 21a and 21b is transmitted. That is, equal portions of the light beams will simultaneously cut-in and cut-out. The resulting effect at display means 1 will be the apparent instantaneous movement of the silhouette aircraft to its new position on the map. Further, due to the change in color of the colored light source from red to green, the square surround will now appear red which may, for purposes of explanation, indicate to the observer that the aircraft in its new position has now been identified. At this juncture, if it is desired to once again observe the prior position of the aircraft, discs 20c and 21c may be rerotated to their original position. Further innovations possible with the basic display system of FIG. 5 would include having the map area 1a printed directly on the display surface with either black or vari-colored printing without exhibiting any loss of visual perception. This would eliminate the necessity for having the map outline printed on medium 40, and would be particularly useful in situations where the same map outline is to appear unchanged in a number of subsequent projections. It would also be possible to have map outlines, grid lines, etc. printed on a transparent overlay which may be drawn down over the display surface when desired, or to have an auxiliary projector to project an overlay on the display surface while projector 20 projects the changing information in the manner described. It is to be also understood that display surface 1 includes the type of projection screens which are normally viewed from the opposite side and in instances where large groups of observers are to view the display it may be preferable so the observers would not interfere with the projection beam.

It is seen from the above discussion that a novel display system for producing colored information displays has been devised. The system requires only two sources of light, only one of which need be a distinct color. The system is compatible with most existing image printing devices and, requires only simple, basic projection and optical techniques. The color areas of the resultant display may be any size or shape within wide limits, it only being necessary to keep a minimum area surround for a large color area, and to keep small color areas within the limits of visual color acuity where color is desired, but where the appearance of black lines or characters are desired, the small color areas should be either beyond the limit of visual color acuity or the area should receive no light at all.

It is to be understood that the systems of FIGS. 1, 3 and 5 will, depending upon the physical environment, possibly require various focusing lenses, power supplies, driving motors and other factors which are mere matters of design and for purposes of clarity and brevity, are not herein illustrated.

While I have described above the principles of my invention in connection with specific apparatus, it is to be clearly understood that this description is made only by way of example and not as a limitation to the scope of my invention as set forth in the objects thereof and in the accompanying claims.

I claim:

1. A display system comprising a display means, said display means having at least a given selected area, a source of white light, a source of colored light, means for simultaneously projecting white and colored light on said display means, and a transparent medium having a plurality of elements disposed thereon including light transparent and opaque elements for simultaneously varying the amount of colored and white light applied to said given area to produce therein a portion having a color other than the color of said colored light source and in another portion a color having a color different from said other color.

2. A display system according to claim 1 wherein said plurality of light transparent and opaque elements include characters, numerals, letters and geometric shapes.

3. A display system comprising a display means, said display means having at least a given selected area, a source of white light, a source of colored light, means for simultaneously projecting white and colored light on said display means, and means for simultaneously superimposing selected portions of said white and colored light in said given area to produce therein a portion having a color other than the color of said colored light source and another portion having a color different from said other color.

4. A display system for viewing a plurality of items of intelligence in different colors comprising a display means, a source of white light, a source of colored light, means for simultaneously projecting white and colored light on said display means, means for simultaneously applying selected portions of said white and colored light to said display screen to simultaneously produce areas having a portion of a color other than the color of said colored light source, and another portion of a color different from said other color and areas having combinations of any two of the colors white, the color of said colored light source and black.

5. A display system comprising a display surface having at least a given selected area thereon, a source of white light, means for directing said white light onto said display surface, a source of colored light, means for directing said colored light onto said display surface, and means to simultaneously interrupt first selected portions of said white light to said given area and second selected portions of said colored light to said given area leaving third selected portions of said white light and said colored light impinging on said display surface to produce a visual display in said given area including said color of said colored light source and a color distinct from the color of said colored light source on a substantially white background.

References Cited in the file of this patent

UNITED STATES PATENTS

| | | |
|---|---|---|
| 2,755,715 | Tuttle et al. | July 24, 1956 |
| 2,854,886 | Stroud | Oct. 7, 1958 |
| 2,862,818 | Tyler et al. | Dec. 2, 1958 |
| 2,958,258 | Kelly | Nov. 1, 1960 |

FOREIGN PATENTS

| | | |
|---|---|---|
| 636 | Great Britain | of 1914 |
| 495,821 | Great Britain | Nov. 14, 1938 |
| 723,534 | Great Britain | Feb. 9, 1955 |

OTHER REFERENCES

"On Reflex Visual Sensations and Color Contrast" (Allen), Journal of the Optical Society of America, vol. 7, No. 11, page 936, November 1923.

"Perceived Color" (Jameson et al.), Journal of the Optical Society of America, vol. 49, No. 9, page 897, September 1959.